B. H. ROBBINS.
TIRE FILLER AND METHOD OF MAKING SAME.
APPLICATION FILED JAN. 17, 1916.

1,201,985. Patented Oct. 17, 1916.

Inventor
Burr H. Robbins
by Townsend Graham & Lawine
his Attorneys

UNITED STATES PATENT OFFICE.

BURR H. ROBBINS, OF PASADENA, CALIFORNIA.

TIRE-FILLER AND METHOD OF MAKING SAME.

1,201,985.  Specification of Letters Patent.  Patented Oct. 17, 1916.

Application filed January 17, 1916. Serial No. 72,631.

*To all whom it may concern:*

Be it known that I, BURR H. ROBBINS, a citizen of the United States, residing at Pasadena, in the county of Los Angeles and State of California, have invented a new and useful Tire-Filler and Method of Making Same, of which the following is a specification.

My invention relates to tires, such as are ordinarily used on automobiles and similar vehicles, and the principal object of the invention is to supply a filler which will serve as a substitute for the inflated inner tube used in the standard form of pneumatic tire.

Various attempts have been made to substitute various materials such as rubber sponge for the inner tube of pneumatic tires, but all such fillers are somewhat objectionable on account of their high first cost, their heavy weight, and their lack of durability.

By my invention I provide a filler which may be placed inside the standard outer tube and which will be practically equivalent in resiliency and elasticity to the inflated inner tube now commonly used, and which will further be light in weight and extremely durable.

Further objects and advantages will be made evident hereinafter.

Figure 1:
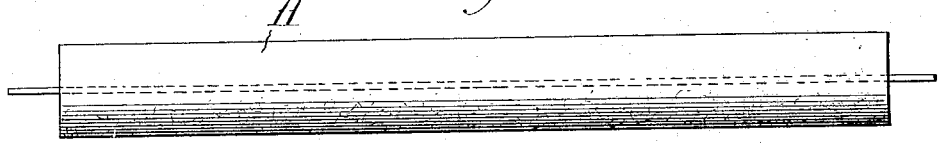
Figure 2:
Figure 4:
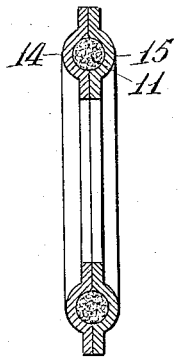
Figure 3:
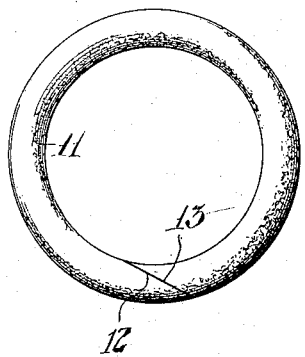
Figure 5:
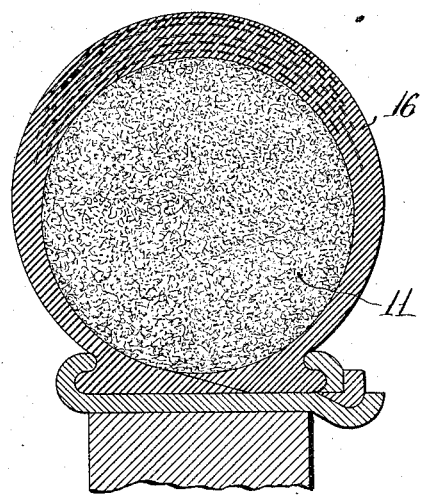

Referring to the drawings, which are for illustrative purposes only: Figure 1 illustrates the filler at a certain stage of its manufacture. Fig. 2 illustrates the filler at a later stage of its manufacture. Fig. 3 illustrates the filler in its completed form. Fig. 4 is a vertical cross section of the mold used to shape the filler, and Fig. 5 is an enlarged cross section of the filler in place on the tire.

In my invention I use a filler composed of felted wool, this filler being first formed in the shape of a continuous cylinder 11, as shown in Fig. 1, and then being felted to a size shown in Fig. 2, the ends of the cylinder shown in Fig. 2 being cut or scarfed off at an angle on the lines 12 and 13, and the filler after being so cut being bent in the form shown in Fig. 3 and placed between molds 14 and 15 shown in Fig. 4, in which it is shrunk so that it will retain the form shown in Fig. 3. The completed filler is then placed inside a standard casing 16, as shown in Fig. 5, such as is ordinarily used in a pneumatic tire. In practice I prefer to felt the material of the filler rather loosely and to compress it in place inside the casing 16, pulling the casing down by pneumatic or screw pressure so that the completed tire is under considerable initial tension.

I am aware that previous attempts have been made to make tire fillers of various materials, and I attach great importance to the method by which my tire filler is produced. It may be explained that it is very difficult to produce rolls of felt of sufficient size to make fillers which have the necessary mechanical characteristics, due to the fact that there is great liability of the interior of the roll being imperfectly felted and compacted. Where the ordinary methods of felting are used to produce rolls of this nature, there is great liability of a hole forming through the center of the roll, and when subjected to the working action of the tire it is found that this hole becomes enlarged and the filler gradually disintegrates. By the following process I produce a filler which is absolutely homogeneous and one which will stand up inside a tire over long periods without being mechanically altered.

The process by which I produce a tire may be explained as follows: Assuming that fillers are to be made which will be suited to go inside a 34"x4" casing, the following method is used: A sheet of felting material, preferably wool, 42 yards long, 88 inches wide and ½ inch thick is first produced, this material weighing 42½ pounds and being later cut up into five pieces, each piece being 8½ pounds in weight, 88 inches wide, and 8½ yards long. This material is first sprayed with a soap solution, while flat, and is then rolled up on a ¼ inch rod 100 inches long. The soap solution may be produced by dissolving 8 ounces of neutral soap in 1 gallon of water. Sufficient soap solution is added to render the whole mass of felting material moderately moist, the operator feeling it with his hands as he rolls it on the rod to be sure that this condition is obtained. This material makes a soft roll approximately 16 inches in diameter and this roll is rolled up in two thicknesses of unbleached sheeting which has been wet down with the soap solution. The operator works the material in his hands, pulling it endwise at the same time, until he obtains a roll approximately 8 inches in diameter, and then removes the rod. This roll is then put in a fulling mill and worked for one hour, being kept moderately moistened with the soap solution. During this time it is partially felted, being reduced in size, and the material being thoroughly worked together. It is then taken from the fulling mill and soaked in 3° Baumé solution of sulfuric acid, this soaking ordinarily taking about twenty minutes. The roll is then taken from the acid solution and worked in the fulling mill for six hours, or until it reaches the required size, being kept wet with acid during this entire time. It is then removed from the fulling mill, washed, and the acid neutralized with a 4° Baumé sodium solution. After this it may be waterproofed, if desired, by means of sugar of lead, or any other convenient material.

By using the above process, a uniform felting is produced, so that the roll is homogeneous throughout its thickness and thoroughly felted.

I claim as my invention:—

1. The method of producing a tire filler of felted material comprising the following steps; producing a flat sheet of unfelted felting material; rolling said sheet to form a cylinder; felting said cylinder; and cutting the ends of said cylinder and forming it into a circular ring of cylindrical section.

2. The method of producing a tire filler of felted material comprising the following steps; producing a flat sheet of unfelted felting material; soaking said sheet with neutral soap solution; rolling said sheet to form a cylinder while wet with said soap solution; felting said cylinder and keeping it moist with said soap solution; treating the cylinder when partially felted with a diluted acid solution; continuing and completing the felting process; washing the completed cylinder to remove the excess of acid; and cutting the ends of said cylinder and forming it into a circular ring of cylindrical section.

3. The method of producing heavy masses of felt which consists in partially felting the felting material while wet with a neutral soap solution; soaking the partially felted material in an acid solution; and completing the felting process in an acid solution.

In testimony whereof, I have hereunto set my hand at Los Angeles, California, this 10th day of January, 1916.

BURR H. ROBBINS.

Copies of this patent may be obtained for five cents each, by addressing the "Commissioner of Patents, Washington, D. C."